US012006629B2

(12) United States Patent
Gu et al.

(10) Patent No.: US 12,006,629 B2
(45) Date of Patent: Jun. 11, 2024

(54) PAPER FORMING MOLD, MOLD MANUFACTURING METHOD, AND PAPER MANUFACTURED BY FORMING MOLD

(71) Applicants: CHENGDU BANKNOTE PRINTING CO., LTD, Sichuan (CN); CHINESE SEAL BANKNOTE MAKING CORPORATION, Beijing (CN)

(72) Inventors: Guangquan Gu, Sichuan (CN); Zheng Li, Sichuan (CN); Yawei Zhang, Sichuan (CN); Xu Deng, Sichuan (CN); Xiaojun Jiang, Sichuan (CN); Le Zhang, Sichuan (CN); Anyun Wang, Sichuan (CN); Jige Zhou, Sichuan (CN); Yu Guo, Sichuan (CN); Sijun Liu, Sichuan (CN); Jian Gao, Sichuan (CN)

(73) Assignees: CHENGDU BANKNOTE PRINTING CO., LTD, Sichuan (CN); CHINESE SEAL BANKNOTE MAKING CORPORATION, Beijing (CN)

( * ) Notice: Subject to any disclaimer, the term of this patent is extended or adjusted under 35 U.S.C. 154(b) by 32 days.

(21) Appl. No.: 17/783,304

(22) PCT Filed: Nov. 20, 2020

(86) PCT No.: PCT/CN2020/130480

§ 371 (c)(1),
(2) Date: Oct. 20, 2022

(87) PCT Pub. No.: WO2021/115102

PCT Pub. Date: Jun. 17, 2021

(65) Prior Publication Data

US 2023/0037506 A1 Feb. 9, 2023

(30) Foreign Application Priority Data

Dec. 13, 2019 (CN) ........................ 201911285850.X

(51) Int. Cl.
*D21F 1/44* (2006.01)
*B41F 11/02* (2006.01)
(Continued)

(52) U.S. Cl.
CPC ................ *D21F 1/44* (2013.01); *B41F 11/02* (2013.01); *D21F 11/006* (2013.01); *D21H 27/02* (2013.01)

(58) Field of Classification Search
CPC .......... D21F 1/44; D21F 11/006; B41F 11/02; B41F 15/38; D21H 27/02; B42D 25/29;
(Continued)

(56) References Cited

U.S. PATENT DOCUMENTS

2019/0077183 A1* 3/2019 Jain ...................... B42D 25/333

FOREIGN PATENT DOCUMENTS

CN 104213452 A 11/2017
CN 111231493 A 6/2020

* cited by examiner

*Primary Examiner* — Jacob T Minskey
*Assistant Examiner* — Matthew M Eslami
(74) *Attorney, Agent, or Firm* — Westbridge IP LLC

(57) ABSTRACT

A paper forming mold, comprising a roller (1). A number of through micropores are formed on a wall of the roller (1), and one or more patterns and characters of a normal watermark, a white watermark, a windowed security thread, and a paper marker are carved on the wall of the roller (1). The paper forming mold has a high reproducibility for an original watermark design draft, improves consistency, clarity, three-dimensionality, detail refinement and richness of the watermark in paper, and thus enhances the anti-counterfeiting function of the watermarked paper; the service life of the paper forming mold is prolonged; and the automation level of paper forming mold manufacturing is improved, and the labor intensity is greatly reduced.

14 Claims, 6 Drawing Sheets

(51) Int. Cl.
*D21F 11/00* (2006.01)
*D21H 27/02* (2006.01)

(58) Field of Classification Search
CPC .... B42D 25/355; B42D 25/333; B41C 1/141; B41C 1/145; B41C 1/147
See application file for complete search history.

PAPER FORMING MOLD, MOLD MANUFACTURING METHOD, AND PAPER MANUFACTURED BY FORMING MOLD

TECHNICAL FIELD

The present invention relates to the technical field of anti-counterfeit printing, and in particular to a paper-forming mold, a method for manufacturing the forming mold, and paper.

BACKGROUND ART

An existing paper-forming production process mainly lies in that a watermark draft is first designed, carving of a watermark plate and manufacturing of a multi-layer watermark copper wire (网) are then performed, and finally, the watermark copper wire is sleeved on a retractable framework to obtain a watermark cylinder mold for making watermarked paper.

An existing process for manufacturing a paper-forming mold has the following defects:

(1) The reproducibility of a watermark draft is somewhat reduced during plate finishing. During the carving of the watermark plate, watermark plate finishing personnel should finish the corresponding regions and parts of the watermark plate to different degrees on the basis of the breakage of copper filaments (丝) after a watermark pressure test, and there is a certain difference between the finished watermark plate and the original design draft, that is, the reproducibility of the watermark draft is reduced.

(2) The reproducibility of the watermark draft is further reduced during watermarking. During the watermarking of the watermark plate on a copper surface wire, since the copper wire has a certain elasticity, the pressed watermark will, after a pressure of an oil press is released from the watermark plate, rebound to varying degrees, giving rise to secondary reduction of the reproducibility of the watermark draft by a watermark pattern.

(3) The watermark refinement and miniaturization cannot be achieved by means of pressurized closing of upper and lower plates. During watermark pressing, fine, miniature and sharp patterns and lines are prone to breaking copper wire filaments, or even causes holes, which results in large discontinuities in the patterns and lines. During papermaking, it is likely to cause the phenomenon of pulp exposure or attachment and to affect the integrity of the watermark. The existing watermarking process cannot solve the problem of contradiction between the watermark refinement and miniaturization and the breakage of the copper wire filaments.

(4) The positioning accuracy of watermarks (including normal watermarks and white watermarks), a windowed security thread, and a marker fluctuate greatly. As the key raw material for wire manufacturing, different batches of copper wires will have inconsistent shrinkages during wire pressing due to the inconsistency of tensile strengths and the shrinkages of warps and wefts during wire manufacturing. Moreover, frequent rolling and pulling of the copper wires during wire manufacturing often cause positioning size problems such as an over-standard watermark radian or diagonal line.

(5) A new manufactured cylinder mold needs to run on a paper machine for a period of time, typically two or three days. In this process, the cylinder mold is likely to fail, and it is often necessary to stop the machine for manual handling. This results in frequent start and stop time of the paper machine, affecting the production efficiency and the papermaking yield, and increasing the operation cost of paper machine procedures.

(6) During the operation of the cylinder mold, the surface flatness, circular degree, and other quality indicators of the cylinder mold will be affected due to the factors of a cylinder mold framework.

(7) The consistency of the watermark cannot be guaranteed, and on-line inspection is difficulty. A surface wire and a bottom wire contain hundreds of watermarks, and the pressing of all the hundreds of watermarks is completed by a watermark plate. During pressing, as the number of pressing increases, the watermark plate will be worn to a certain degree, which may produce a corresponding degree of influence on the consistency of the watermarks. In addition, the copper filaments of the surface wire in a watermarking region are arranged in different positions, and the degree of squeezing of the copper filaments is somewhat different. The above factors cannot ensure the consistency of the watermarks, and also bring a great difficulty to the on-line inspection of the watermarks of the surface wire.

(8) The service life of the cylinder mold is short. The surface wire of the cylinder mold is made of a copper material, and has a poor wear resistance. During the operation of the cylinder mold in a vat of the paper machine, local wear is likely to occur and cannot be repaired manually, forcing the removal of the cylinder mold from the machine. This not only affects the quality of the paper watermark and the papermaking efficiency, but also increases the papermaking production cost.

(9) During manufacturing of the cylinder mold, the labor intensity is large, there are more quality risk points during processing, and process control is difficult. At present, a film for making a normal watermark, a white watermark, or a marker needs to be made separately, and is then attached to an outer surface of a watermark cylinder mold after being made. The surface treatment, adhesion and other operations of the film are completed manually, causing a considerable workload. In addition, the process of manufacturing the cylinder mold includes multiple steps of watermark plate manufacturing, plate finishing, film manufacturing, cylinder mold installation, etc. There are many quality risk points, and it is difficult to control the quality of the process.

SUMMARY OF THE INVENTION

In view of the problems and shortcomings in the prior art, one of the objects of the present invention is to provide a paper-forming mold, which improves the reproducibility of a corresponding design draft of patterns and characters, ensures the consistency of watermark presentation effects in papermaking, and realizes detailed refinement of the patterns and characters.

The paper-forming mold provided by the present invention comprises the following specific implementations under the same technical concept:

First implementation: a paper-forming mold, comprising a roller, wherein a number of through micropores are formed on a wall of the roller, and one or more patterns and characters of a normal watermark, a white watermark, a windowed security thread, and a paper marker are carved on the wall of the roller.

In the paper forming mold of the first structure, the micropores and the patterns and characters are provided on the roller.

Second implementation: a paper forming mold, comprising a roller and a pattern and character block, wherein a number of through micropores and a through hollowed-out part are provided on the wall of the roller, and the pattern and character block are detachably mounted to the hollowed-out part of the roller; and one or more patterns and characters of a normal watermark, a white watermark, a windowed security thread, and a paper marker are carved on the pattern and character block.

In the paper forming mold of the second structure, the micropores are provided on the roller, the patterns and characters are provided on the pattern and character block, and the roller is detachably connected to the pattern and character block, facilitating separate replacement of the pattern and character block.

The common technical concept of the paper forming molds of the two structures described above lies in that a watermark cylinder mold formed by weaving metal filaments is replaced by a roller formed with a number of micropores, and anti-counterfeiting elements such as patterns and characters are created in the papermaking step.

First, the roller and the watermark cylinder mold are both thin-walled cylindrical structures. The wall of the roller is of a compact thin-plate structure, and a body of the watermark cylinder mold is of a net-shaped structure formed by crosswise embossing horizontal and vertical metal filaments up and down, so that when the two structures have the same wall thickness, the roller has higher strength and better surface flatness and circular degree. Thus, without penetrating the wall of the roller or the metal filaments, patterns and characters are created on the roller and the watermark cylinder mold that have the same wall thickness, so that lines which can be created on the roller have a greater depth, and the spacing between adjacent lines is smaller. If the difference of the line depths is large, the visual effect will be more three-dimensional, and if the lines are narrow and the spacing between adjacent lines is small, the visual effect will be more refined.

Second, the pore diameters and porosities of the micropores on a roller can all be adjusted to be not exactly the same. With regard to a watermark cylinder mold of which the sizes and shapes of all voids are basically consistent, the bright contrast of a watermark can be improved by adjusting the water filtration rate while ensuring that the water filtration functions.

The roller is provided with a number of micropores that penetrate the wall of the roller for filtering water. The watermark cylinder mold filters water through the voids between thin metal filaments, and in a squeezing working environment where repeated friction is required, the wall of the roller at the edges of the micropores is high-strength and wear-resistant relative to the nodes where the thin metal filaments cross. Therefore, the roller structure can greatly prolong the service life of the forming mold during papermaking.

Moreover, the patterns and characters of a normal watermark, a white watermark, a windowed security thread, a paper marker, etc. on the roller are formed by carving. As a result, intermediate procedures such as plate finishing, pressing, and adhesion are omitted when the patterns and characters are created by using the watermark cylinder mold, the loss of details of the patterns and characters is avoided, the reproducibility of the corresponding design draft is thus improved, and the consistency of the draft and the firmness of the white watermark and the paper marker during papermaking are ensured.

It should be noted that both the normal watermark and the white watermark described in the present invention are watermarks, but they are distinct.

1. Normal Watermark.

A watermark creating mold has a transition region in a watermark region for creating a normal watermark, and is provided with micropores or voids having a water filtration function. In addition, the created normal watermark has a gray-scale and layered visual effect. In the prior art, a watermark region for creating a normal watermark is directly formed by pressing.

2. White Watermark.

A watermark creating mold has no transition region in a watermark region for creating a white watermark, and is not provided with micropores or voids having a water filtration function. In addition, the created white watermark does not have a layered visual effect. In the prior art, a watermark region for creating a white watermark is formed by attaching a separately made metal film to a watermark cylinder mold.

Further, although the strength of the roller can be improved by increasing the wall thickness, reinforcing ribs are generally arranged in the roller in order to increase the strength of the roller while the weight of the entire mold is not excessively increased.

Another object of the present invention is to provide a method for manufacturing a paper forming mold.

With regard to the paper forming mold of the first structure, a roller is manufactured first and the paper forming mold is then designed according to the characteristics of patterns and characters and requirements for water filtration Finally, micropores and the patterns and characters are created on a wall of the roller according to the design, and the creating of the micropores and the patterns and characters is not limited to a specific order.

With regard to the paper forming mold of the first structure, a manufacturing method is further provided. The micropores and the patterns and characters are first created on a flat plate, and the flat plate is then curled to form a cylindrical shape. The process of creating the micropores and the patterns and characters is not limited to a specific order.

With regard to the paper forming mold of the second structure, a manufacturing method is also provided. First, roller is manufactured, then the paper forming mold is designed according to the characteristics of patterns and characters and requirements for water filtration. The micropores and the hollowed-out part are then created on a wall of the roller according to the design, a pattern and character block having patterns and characters is separately created, and finally, the created pattern and character block are embedded in the hollowed-out part of the roller. The creating of the micropores and the patterns and characters is not limited to a specific order.

In the three methods for manufacturing a paper forming mold described above, the creating of the micropores and the patterns and characters is not limited to a specific order. That is, any one of the following modes can be used:

Mode 1: the micropores are created first, and the patterns and characters are then created;

Mode 2: the patterns and characters are created first, and the micropores are then created;

Mode 3: the creating of the micropores is performed concurrently with, separate from, and not interspersed with the creating of the patterns and characters; and Mode 4: the creating of the micropores is performed concurrently with, and interspersed with the creating of the patterns and characters.

In the present invention, a paper forming mold and a method for manufacturing the same are developed. First, a three-dimensional model of a normal watermark is designed. Subsequently a large number of patterns and characters of a normal watermark, a white watermark, a windowed security thread, and a paper marker, etc. are carved on a roller and/or a pattern and character block, and micropores are formed on the roller. Carving the patterns and characters and forming the micropores may be performed in a reversed order or may be performed simultaneously. In the watermark region, the micropores are designed according to the characteristics of the watermark patterns and characters, and the porosities of the micropores and the pore diameters of individual pores in various regions are different.

The present invention is mainly intended to reduce the steps of plate finishing, normal watermark pressing, the manufacturing and adhesion of a white watermark and a high-bright normal watermark sheet, the pressing of a windowed security thread, and the manufacturing of a multilayer wire during the manufacturing of an existing paper forming mold, and to develop a manufacturing process technique for a paper forming mold, by which carving of a normal watermark, a white watermark and a windowed security thread, and micropore forming are directly performed on a roller so as to obtain a paper forming mold. That is, the roller is equivalent to a watermark cylinder mold used in current production, and paper can be made by directly assembling the roller in a vat of a paper machine.

Using the paper forming mold of the present invention for papermaking, a three-dimensional model draft of a watermark has a high reproducibility. The carved watermark has a good consistency, and the on-line quality inspection of the watermark on the paper forming mold can be achieved. According to a special design, it is possible for details, such as lines, to be continuous. The details of a watermark in paper are obvious, and can achieve a miniature and ultra-clear effect. The automation degree of the whole manufacturing process is high and the paper forming mold has a long service life.

Compared to the prior at, the present invention has the following advantages and benefits:

(1) The reproducibility of an original design draft is high. A normal watermark, a white watermark, and a windowed security thread can be directly carved on the paper forming mold so that intermediate procedures such as plate finishing, pressing, and adhesion are omitted, the loss of details of patterns and characters is avoided. Thus, the reproducibility of a corresponding design draft is thus improved, and the consistency of the draft and the firmness of the white watermark and the paper marker during papermaking are ensured.

(2) The adjustability of the micropores on the paper forming mold is strong. The diameters and distribution density of the micropores on the roller can be freely designed and adjusted according to the characteristics of the patterns and characters of a normal watermark, etc. The requirements for water filtration ensure that the corresponding parts, such as watermark lines, have better continuity and integrity, and higher bright contrast of the watermark is achieved.

(3) It is possible to manufacture an ultra-refined watermark with a complex pattern. This technique can achieve the richness, fullness, and high definition of ultra-refined watermark lines and watermark details by means of direct carving, making the edge contour of a watermark more distinct, and ensuring that the watermark is more three-dimensional.

(4) The paper forming mold has a long service life. A material of high strength, good wear resistance, and strong corrosion resistance may be used to greatly prolong the service life of the paper forming mold during papermaking.

(5) The automation degree is high. Patterns and characters of watermarks, etc. are manufactured by a carving machine, and micropores are formed by technical devices such as a laser.

In the figures, 1. Roller; 2. Pattern and character block; 3. Screw; 4. Reinforcing rib; and 5. Spring.

DETAILED DESCRIPTION OF EMBODIMENTS

In order to better explain the technical features, objects and effects of the present invention, particular embodiments of the present invention will now be described herein with reference to the accompanying drawings.

Embodiment 1

This embodiment provides a paper-forming mold, the paper-forming mold, comprising: a roller 1. A number of through micropores are formed on a wall of the roller 1, and one or more patterns and characters of a normal watermark, a white watermark, a windowed security thread, and a paper marker are carved on the wall of the roller 1.

The main innovation points of the paper-forming mold provided in this embodiment lie in that the paper-forming mold is a roller 1 of a non-woven thin-walled structure, and the roller 1 has both micropores and patterns and characters recessed to different depths. The micropores and the patterns and characters are formed by processing a thin plate body, rather than separate components. Moreover, the heights of the micropores and the patterns and characters do not exceed a surface of the roller 1, and the surface of the roller 1 is free of projections.

A normal watermark and a white watermark described in this embodiment are both watermarks, but the two are not the same, and the differences between them are as follows.

Normal watermark: a mold has a transition region in a watermark region for creating a normal watermark and is provided with voids such as micropores having a water filtration function. In addition, the created normal watermark has a gray-scale and layered visual effect. In the prior art, a watermark region for creating a normal watermark is directly formed by pressing.

White watermark: a mold has no transition region in a watermark region for creating a white watermark and is not provided with voids such as micropores having a water filtration function. In addition, the created white watermark does not have a layered visual effect. In the prior art, a watermark region for creating a white watermark is formed by soldering a separately made metal film to a watermark cylinder mold.

In this embodiment, the micropores are penetrating pores through the wall of the roller 1, inlets of the micropores are located on an outer wall of the roller 1, and outlets of the micropores are located on an inner wall of the roller 1. The inlet of the micropore is in communication with the outlet of the micropore to form a through passage for drainage of a fiber suspension liquid.

Figure 17:
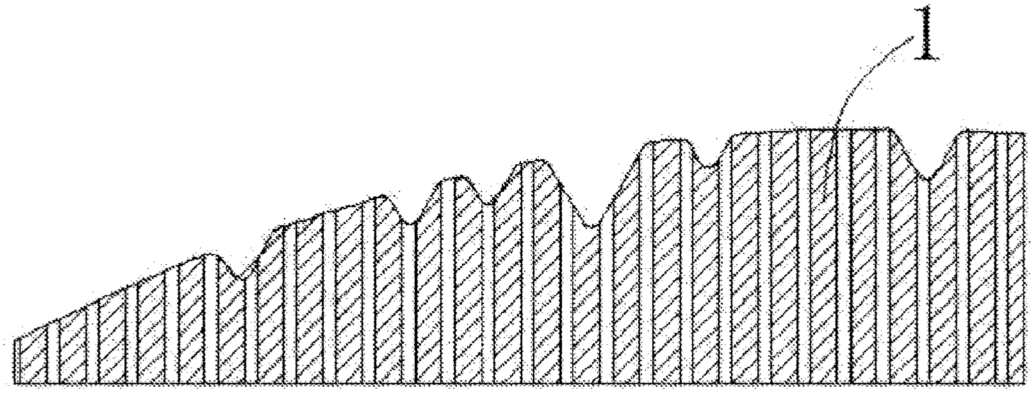
FIG. 17 is a partial schematic structural diagram of a paper forming mold in which micropores are cylindrical pores.
Figure 18:
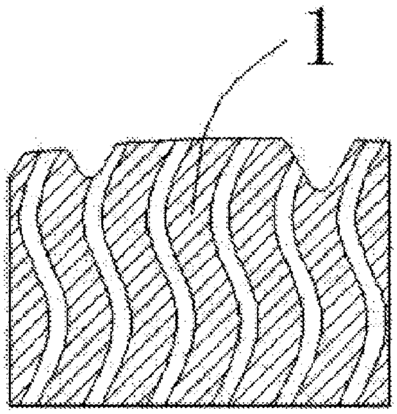
FIG. 18 is a partial schematic structural diagram of a paper forming mold in which micropores are corrugated pores.
Figure 19:
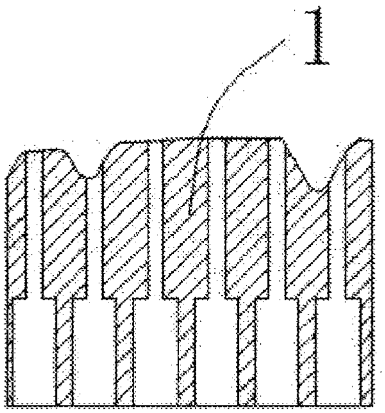
FIG. 19 is a partial schematic structural diagram of a paper forming mold in which micropores are stepped pores.

Generally, a cross section of the micropore passage may be circular, elliptical, polygonal, crescent-shaped, etc. Different cross sections may be the same or different in shape, and the different cross sections may be the same or different in proportion. For example, when the cross section of the micropore passage is circular, the micropore passage may be a cylindrical space, that is, the micropore is a cylindrical pore, as shown in FIG. 17; the micropore passage may be a cone-shaped or frustum-shaped space, that is, the micropore is a conical pore; the micropore passage may be a space with an axial cross section in a corrugated shape, that is, the micropore is a corrugated pore, as shown in FIG. 18; or the micropore passage may be a stepped space with an axial cross section having different upper and lower widths, that is, the micropore is a stepped pore, as shown in FIG. 19. Furthermore, the micropores on one roller may be any one or a combination of cylindrical pores, conical pores, corrugated pores, and stepped pores. For example, all the micropores on one roller 1 are cylindrical pores; or all the micropores on one roller 1 are conical pores; or some of the micropores on one roller 1 are cylindrical pores, some are corrugated pores, and some are stepped pores.

In this embodiment, considering the feasibility of the creating of micropores and the controllability of drainage rate of the micropores, all the micropores on one roller 1 use an equal-diameter perforated structure with a circular cross section, that is, the micropore passages are cylindrical.

Further, the pore diameters of the number of micropores at the same height are all equal or not all equal. With regard to a structure with cylindrical micropore passages, the pore diameters of the number of micropores are equal or not all equal.

In another specific embodiment, micropores on one roller 1 are cylindrical pores of the same pore diameter. In this case, the micropores are cylindrical pores. Compared to a structure using conical pores, the cylindrical pores have the advantage that the pore diameters are consistent at the same height position relative to an outer wall surface or an inner wall surface of the roller 1, facilitating the calculation of the porosity to control the gray scale of the watermarks.

In this embodiment, the porosities of the micropores in different regions are not all equal.

In this embodiment, a solution in which the pore diameters of micropores are not all equal and the densities are not all equal is used to meet the requirements of watermark grayscale change, that is, the porosities of the micropores meeting the requirements of watermark grayscale change are used: the porosities of the micropores are small in a bright part of the watermark and the porosities of the micropores are large in a dark part of the watermark.

For example, when the pore diameters of the micropores are equal, the densities of the micropores are small and the micropores are dispersed in the bright part of the watermark; and the densities of the micropores are large and the micropores are compact in the dark part of the watermark.

For another example, when the micropores have the same density, the pore diameters of the micropores are small in the bright part of the watermark; and the pore diameters of the micropores are large in the dark part of the watermark.

Of course, it is also possible to consider that both the porosities of the micropores and the heights of carving lines of the patterns and characters affect the gray level of the watermark.

Figure 1:
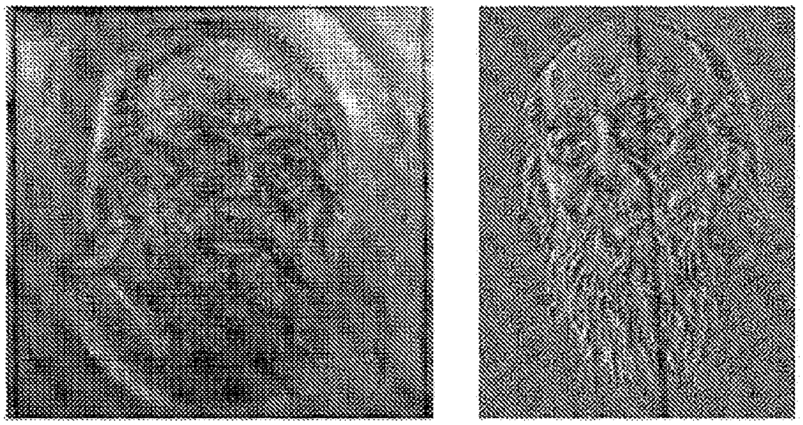
FIG. 1 shows partial schematic diagrams of different paper forming tools having a first exemplary image, in which the left diagram shows a paper forming mold of the present invention, and the right diagram shows a watermark cylinder mold of the prior art.

As shown in FIG. 1, the left diagram is a partial diagram of a watermark pattern having a first exemplary image carved on the wall of the roller 1 in this embodiment, and the right diagram is a partial diagram of a watermark pattern having the first exemplary image pressed on a watermark cylinder mold in the prior art. By contrast, the watermark pattern in the left diagram has a larger difference in line depth, rendering a more refined and three-dimensional pattern with more lines.

Figure 2:
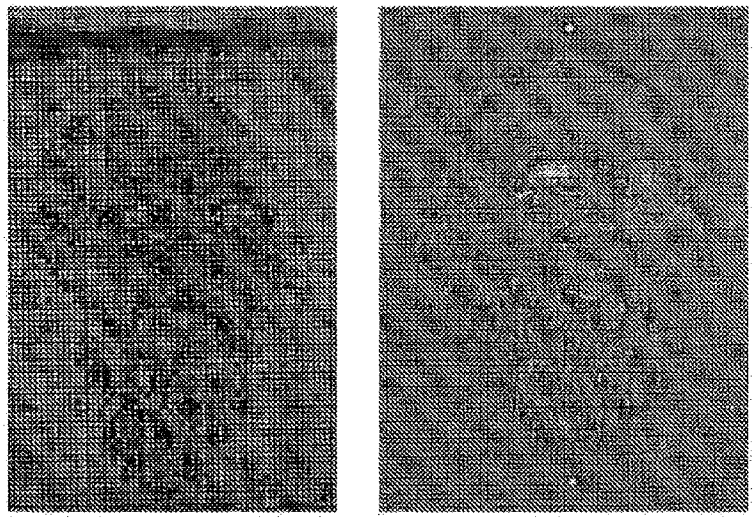
FIG. 2 shows schematic diagrams of different paper forming tools having the first exemplary image in the event of filament breakage, in which the left diagram shows a paper forming mold of the present invention, and the right diagram shows a watermark cylinder mold of the prior art.

As shown in FIG. 2, the left diagram shows filament breakage of the paper forming mold in this embodiment, and the right diagram shows filament breakage of the watermark cylinder mold in the prior art. It can be seen that the filament breakage is very obvious in the right diagram, but is less obvious in the left diagram.

Figure 3:
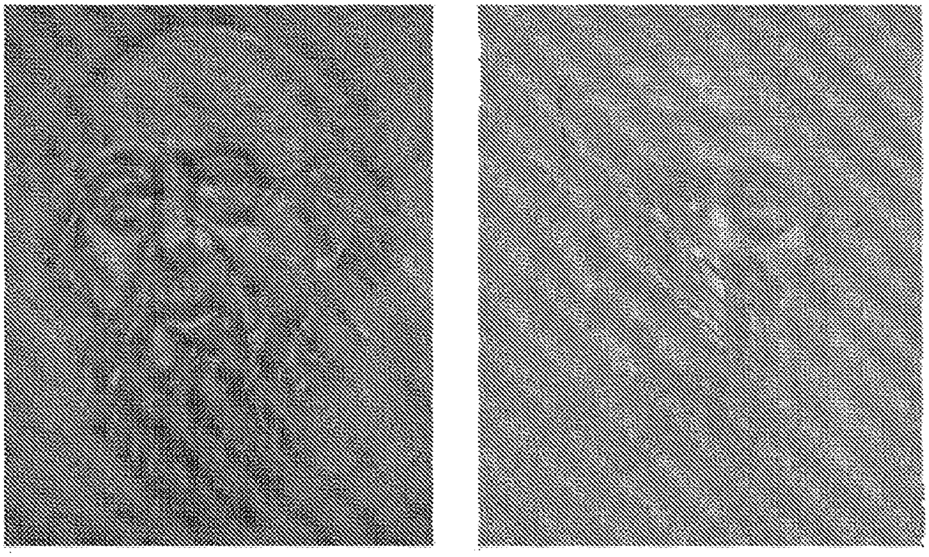
FIG. 3 shows effect diagrams of normal watermarks of the first exemplary image manufactured by using the different paper forming tools, in which the left diagram is an effect diagram of the normal watermark of the first exemplary image manufactured by using the paper forming mold of the present invention, and the right diagram is an effect diagram of the normal watermark of the first exemplary image manufactured by the watermark cylinder mold of the prior art.

As shown in FIG. 3, the left diagram is an effect diagram of a watermark created using the paper forming mold described in the embodiment, and the right diagram is an effect diagram of a watermark created using a watermark cylinder mold in the prior art. Obviously, the watermark in the left diagram is clearer, the presented image is more three-dimensional, and details are more refined.

Figure 4:
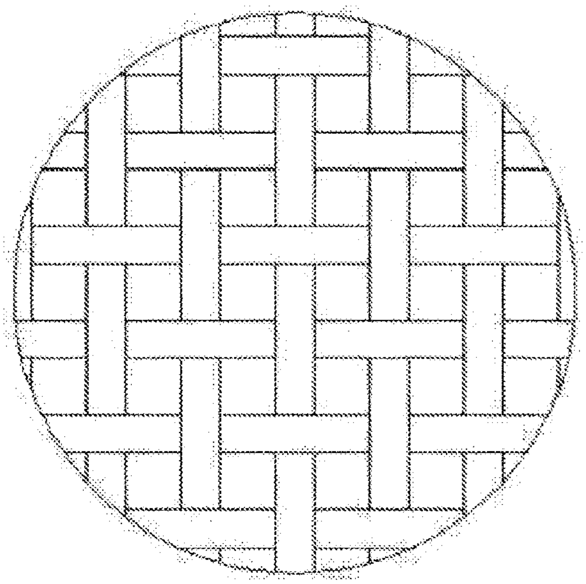
FIG. 4 is a partially enlarged schematic diagram of a watermark cylinder mold formed by weaving in the prior art.
Figure 5:
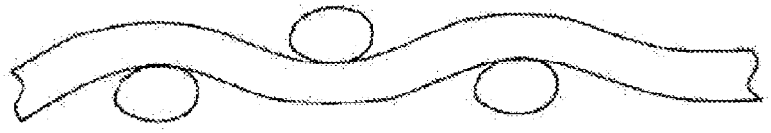
FIG. 5 is a schematic diagram of nodes of warps and wefts of the watermark cylinder mold.

As shown in FIGS. 4 and 5, nodes of warps and wefts of the watermark cylinder mold in the prior art are formed by weaving an upper metal filament and a lower metal filament, so when a watermark pattern is pressed on the watermark cylinder mold, due to the influence of factors such as the structure and strength thereof, the line depth of a watermark is limited, and the filaments are very likely to be broken during the pressing.

It can be seen from the above-described content that the paper-forming mold disclosed in this embodiment has a high reproducibility for an original watermark draft, improves consistency, clarity, three-dimensionality, detail refinement, and richness of the watermark in paper. Thus it enhances the anti-counterfeiting function of the watermarked paper and the service life of the paper-forming mold is prolonged The automation level of mold manufacturing is improved and the labor intensity is greatly reduced.

Further, passages of the micropores are arranged obliquely. It is convenient to drain water during papermaking.

Further, the micropores are created using any one of a laser, an electric spark, and an electron beam, and the patterns and characters are created using a laser carving machine or a mechanical carving machine. In this embodiment, only common creating methods are listed, but the creating of the micropores and the patterns and characters is not limited to the above-mentioned creating methods.

Figure 6:
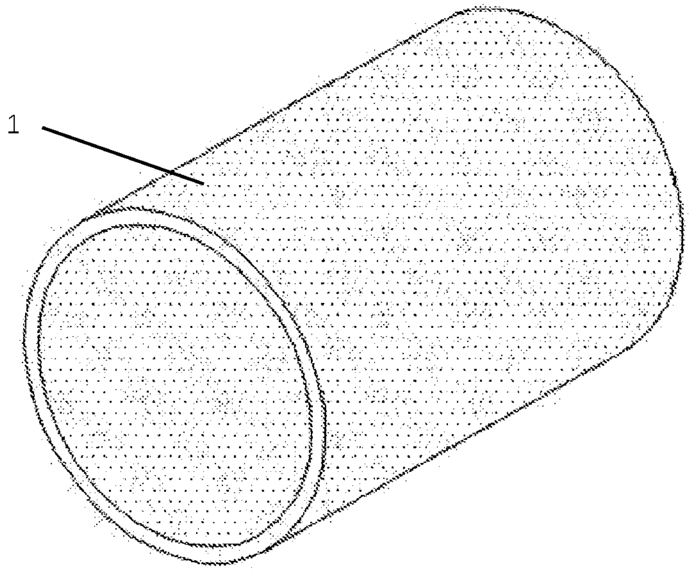
FIG. 6 is a schematic structural diagram of a roller formed with micropores according to the present invention.

As shown in FIG. 6, it is a schematic diagram of the roller 1 on which the micropores are created.

Further, the roller 1 is made of copper or nickel or an alloy or a hydrophobic plastic. The hydrophobic plastic may be selected from polytetrafluoroethylene or polyoxymethylene or polyurethane or polypropylene or polyvinyl chloride.

As shown in FIGS. 1-3, micropores are distributed in all watermark regions covered by the exemplary image, and in this case, the distribution positions of the watermark regions and the micropores are overlapped. When it is required to form a windowed security thread, the micropores are distributed only on the wall around the windowed security thread.

Further, in order to further improve the working strength of the roller 1, reinforcing ribs 4 are further arranged in the roller 1.

Further, the content of the normal watermark or the white watermark or the paper marker is any one or a combination of elements including patterns, letters, numbers, symbols, and characters.

This embodiment also provides a method for manufacturing the above-described paper-forming mold. The method mainly comprises manufacturing of a roller 1, three-dimensional pattern design of a watermark, carving, and perforation. The specific manufacturing method thereof lies in that a roller 1 is manufactured first, the paper forming mold is then designed according to the characteristics of patterns and characters and requirements for water filtration, and finally, micropores and the patterns and characters are created on a wall of the roller 1 according to the design.

The creating of the micropores and the patterns and characters is not limited to a specific order. That is, any one of the following modes can be used:

Mode 1: the micropores are created first, and the patterns and characters are then created;

Mode 2: the patterns and characters are created first, and the micropores are then created;

Mode 3: the creating of the micropores is performed concurrently with, separate from, and not interspersed with the creating of the patterns and characters; and Mode 4: the creating of the micropores is performed concurrently with, and interspersed with the creating of the patterns and characters.

Generally, when the paper-forming mold is manufactured, patterns and/or characters of a normal watermark, a white watermark, a windowed security thread, etc. are directly carved on the roller 1 after micropores are made, or patterns and/or characters of a normal watermark, a white watermark, a windowed security thread, etc. are firstly carved on a pore-free roller 1, and then micropores are made on the roller 1 by applying laser or other techniques.

Further, during the design of the paper-forming mold, the pore diameters of individual micropores, the porosities of micropores in different regions, and lines of the patterns and characters are designed according to the characteristics of the patterns and characters and the requirements for water filtration.

By comparing the use effects of the paper-forming mold described in this embodiment and the watermark cylinder mold in the prior art through multi-group experiments, when being used for papermaking, the paper-forming mold provided in this embodiment has a high reproducibility for an original watermark design draft, improves consistency, clarity, three-dimensionality, detail refinement and richness of the watermark in paper, and thus enhances the anti-counterfeiting function of the watermarked paper. The service life of the paper forming mold is prolonged the automation level of watermark mold manufacturing is improved, and the labor intensity is greatly reduced.

Embodiment 2

This embodiment uses, on the basis of Embodiment 1, a structure in which a roller 1 is separated from a module having a normal watermark, a white watermark, a windowed security thread, and a paper marker.

This embodiment provides a paper-forming mold, comprising a roller 1 and a pattern and character block 2. A number of through micropores and a through hollowed-out part are provided on the wall of the roller 1, and the pattern and character block 2 is detachably mounted to the hollowed-out part of the roller 1. One or more patterns and characters of a normal watermark, a white watermark, a windowed security thread, and a paper marker are carved on the pattern and character block 2.

Further, the pore diameters of the number of micropores at the same height are all equal or not all equal.

Further, the porosities of the micropores in different regions are not all equal.

The main innovation points of the paper-forming mold provided in this embodiment lie in that the paper-forming mold comprises a roller 1 having a non-woven thin-walled structure and a pattern and character block 2. The roller 1 has the micropores and the hollowed-out part for installing the pattern and character block 2, and patterns and characters recessed to different depths are created on the pattern and character block 2.

The micropores are any one or a combination of cylindrical pores, corrugated pores and stepped pores.

Further, passages of the micropores are arranged obliquely.

In order to further improve the working strength of the roller 1, reinforcing ribs 4 are further arranged in the roller 1.

The roller 1 is made of copper or nickel or an alloy or a hydrophobic plastic. The hydrophobic plastic may be selected from polytetrafluoroethylene or polyoxymethylene or polyurethane or polypropylene or polyvinyl chloride.

Further, the content of the normal watermark or the white watermark or the paper marker is any one or a combination of elements including patterns, letters, numbers, symbols, and characters.

This embodiment also provides a method for manufacturing the above-described paper forming mold. The method mainly comprises manufacturing of a roller 1, three-dimensional pattern design of a normal watermark, carving and perforation. The specific manufacturing method thereof lies in that a roller 1 is manufactured first, the paper-forming mold is designed according to the characteristics of patterns and characters and requirements for water filtration, and the micropores and the hollowed-out part are then created on a wall of the roller 1 according to the design. pattern and character block 2 having patterns and characters is separately created, and finally, the created pattern and character block 2 is embedded in the hollowed-out part of the roller 1.

The creating of the micropores and the patterns and characters is not limited to a specific order. That is, any one of the following modes can be used:

Mode 1: the micropores are created first, and the patterns and characters are then created;

Mode 2: the patterns and characters are created first, and the micropores are then created;

Mode 3: the creating of the micropores is performed concurrently with, separate from, and not interspersed with the creating of the patterns and characters; and Mode 4: the creating of the micropores is performed concurrently with, and interspersed with the creating of the patterns and characters.

The other parts of this embodiment are the same as those of Embodiment 1, and therefore, the description thereof will not be repeated.

Embodiment 3

This embodiment optimizes the connection between a pattern and character block 2 and a roller 1 on the basis of Embodiment 2.

With regard to a first connection, as shown in schematic diagrams of a connecting structure for a roller 1 and a pattern and character block 2 in a split-type paper forming mold illustrated in FIGS. 7, 8, 9, 10 and 11, the pattern and character block 2 and the roller 1 are welded or adhered to each other or are in embedded connection with each other only by means of an interference fit. Soldering is usually used for welding.

In FIGS. 7-11, as shown in FIGS. 7, 8, 10 and 11, a hollowed-out part on the roller 1 penetrates through the wall of the roller 1. In the examples shown in FIGS. 7 and 8, the pattern and character block 2 is substantially the same as the roller 1 in thickness, and the top surface of the pattern and character block 2 is substantially the same as an outer wall surface of the roller 1 in height. In the example shown in FIG. 10, the top surface of the pattern and character block 2 is significantly higher than the outer wall surface of the roller 1. In the example shown in FIG. 11, the top surface of the pattern and character block 2 is significantly lower than the outer wall surface of the roller 1.

Figure 7:
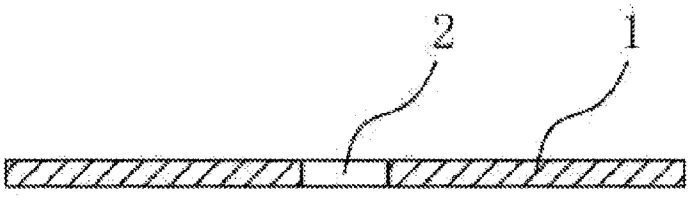
FIG. 7 is a schematic diagram of a connecting structure for a roller and a pattern and character block in a split-type paper forming mold, in which the pattern and character block is a rectangular block.
Figure 8:
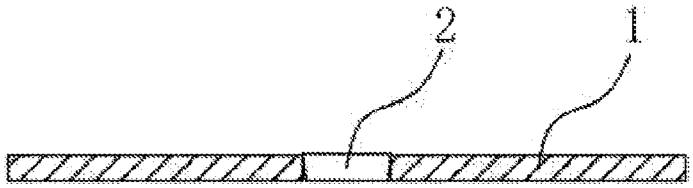
FIG. 8 is a schematic diagram of a connecting structure for a roller and a pattern and character block in a split-type paper forming mold, in which the pattern and character block is a wedge-shaped block.
Figure 9:
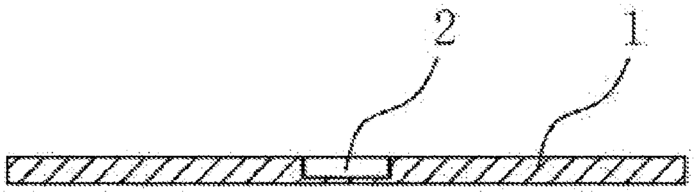
FIG. 9 is a schematic diagram of a connecting structure for a roller and a pattern and character block in a split-type paper forming mold, in which a hollowed-out part of the roller does not penetrate through a wall of the roller.
Figure 10:
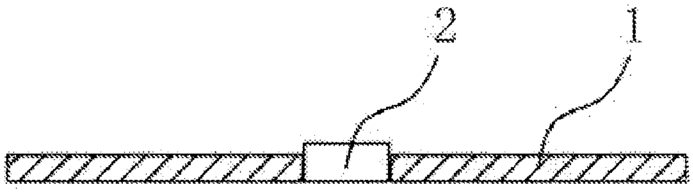
FIG. 10 is a schematic diagram of a connecting structure for a roller and a pattern and character block in a split-type paper forming mold, in which the top surface of the pattern and character block is higher than an outer wall surface of the roller.
Figure 11:
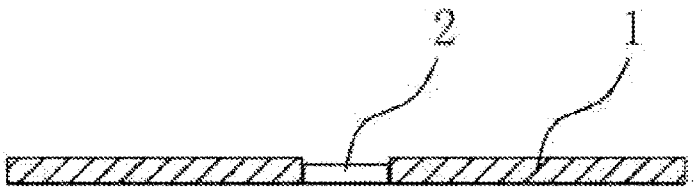
FIG. 11 is a schematic diagram of a connecting structure for a roller and a pattern and character block in a split-type paper forming mold, in which the top surface of the pattern and character block is lower than an outer wall surface of the roller.

In FIGS. 7-11, as shown in FIG. 9, the hollowed-out part on the roller 1 does not penetrate through the wall of the roller 1, the pattern and character block 2 is embedded in the hollowed-out part of the roller 1, and the top surface of the pattern and character block 2 is substantially the same as the outer wall surface of the roller 1 in height. Of course, in this case, the top surface of the pattern and character block 2 may also be slightly higher or slightly lower than the outer wall surface of the roller 1.

Figure 12:
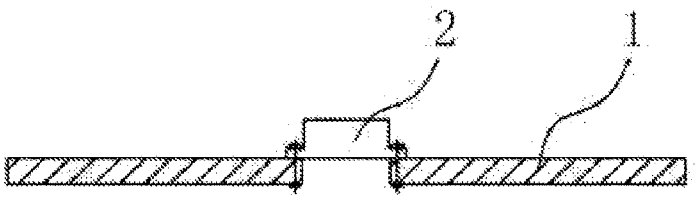
FIG. 12 is a schematic diagram of a connecting structure for a roller and a pattern and character block in a split-type paper forming mold, in which the pattern and character block is connected to the roller by means of screws.

With regard to a second connection, as shown in a schematic diagram of a connecting structure for the roller 1 and the pattern and character block 2 in the split-type paper forming mold illustrated in FIG. 12, the pattern and character block 2 and the roller 1 have a partial structure overlap, and in this case, the pattern and character block 2 and the roller 1 are welded or adhered or connected by means of screws 3.

Figure 13:
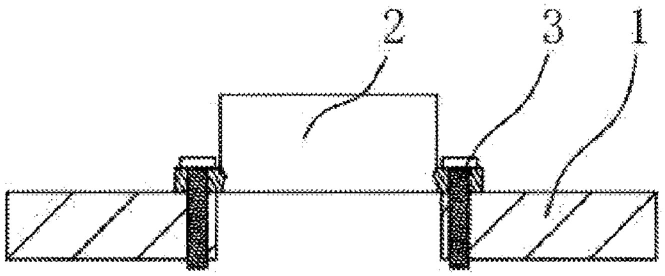
FIG. 13 is a partially enlarged diagram of a connecting position between the roller and the pattern and character block in FIG. 12.

As shown in FIG. 13, the pattern and character block 2 is integrally connected to the roller 1 via the screws 3.

Figure 14:
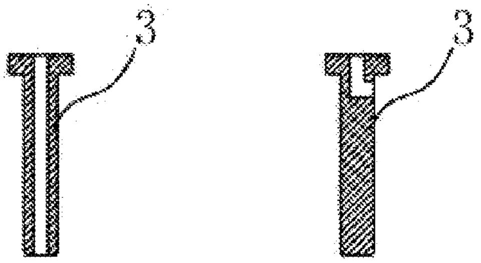
FIG. 14 shows schematic cross-sectional diagrams of screws with two water filter hole flow passage designs.

Further, as shown in FIG. 14, the screw 3 is provided with a water filter hole, and a water passage structure of the water filter hole has two types of “|” and “L”. For example, the left in FIG. 14 is a linear water filter hole structure penetrating through the center of the screw 3, and the right diagram in FIG. 14 is an L-shaped water filter hole structure not penetrating through the center of the screw 3.

Figure 15:
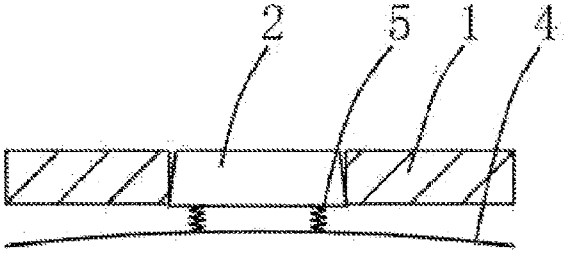
FIG. 15 is a schematic diagram of a connecting structure for a roller and a pattern and character block in a split-type paper forming mold, in which the pattern and character block is pressed into a hollowed-out part of the roller by means of a spring mounted on a reinforcing rib.

With regard to a third connection, as shown in a schematic diagram of a connecting structure for the roller 1 and the pattern and character block 2 in the split-type paper-forming mold illustrated in FIG. 15, the pattern and character block 2 is pressed into the hollowed-out part of the roller 1 by means of a spring 5 mounted on a reinforcing rib 4.

The other parts of this embodiment are the same as those of Embodiment 2, and therefore, the description thereof will not be repeated.

Embodiment 4

Figure 16:
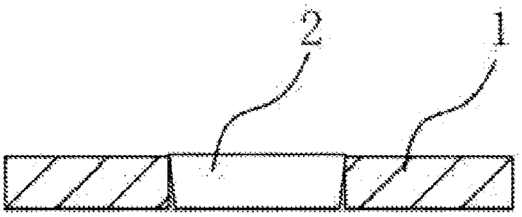
FIG. 16 is a schematic diagram of a connecting structure for a roller and a pattern and character block in a split-type paper forming mold, in which the pattern and character block is a wedge-shaped block, and the wedge-shaped block is embedded into the hollowed-out part from the interior of the roller.

This embodiment optimizes the structure of the pattern and character block 2 on the basis of Embodiment 2 or Embodiment 3. As shown in FIG. 7, the pattern and character block 2 is a rectangular block with upper and lower ends having the same length. Alternatively, as shown in FIGS. 8, 15, and 16, the pattern and character block 2 is a wedge-shaped block with upper and lower ends having different lengths.

The other parts of this embodiment are the same as those of Embodiment 2 or Embodiment 3, and therefore, the description thereof will not be repeated.

Embodiment 5

This embodiment provides paper-forming molds of two structures.

The paper-forming mold of a first structure comprises a roller 1. A number of through micropores are formed on a wall of the roller 1, and one or more patterns and characters of a normal watermark, a white watermark, a windowed security thread, and a paper marker are carved on the wall of the roller 1.

The paper-forming mold of a second structure comprises a roller 1 and a pattern and character block 2. A number of through micropores and a through hollowed-out part are provided on the wall of the roller 1, and the pattern and character block 2 is detachably mounted to the hollowed-out part of the roller 1. One or more patterns and characters of a normal watermark, a white watermark, a windowed security thread, and a paper marker are carved on the pattern and character block 2.

In the paper-forming molds of the two structures described above, the pore diameters of the number of micropores at the same height are all equal or not all equal, and the porosities of the micropores in different regions are not all equal.

With regard to the paper-forming molds of the two structures described above, a manufacturing method is further provided on the basis of Embodiment 1 or Embodiment 2. The micropores and the patterns and characters are first created on a flat plate, and the flat plate is then curled to form a cylindrical shape, and the creating of the micropores and the patterns and characters is not limited to a specific order.

The other parts of this embodiment are the same as those of Embodiment 1 or Embodiment 2, and therefore, the description thereof will not be repeated.

Embodiment 6

According to any one of Embodiments 1-5, this embodiment provides paper made by the paper-forming mold disclosed in Embodiments 1-5. The paper is a security paper for anti-counterfeiting printing.

Those described above are merely preferred embodiments of the present invention and are not intended to limit the invention in any form, and any simple modifications and equivalent improvements made on the above embodiments according to the technical essence of the present invention shall fall within the scope of protection of the present invention.

The invention claimed is:

1. A paper forming mold, wherein the paper forming mold comprises a roller and a pattern and character block, wherein a number of through micropores and a hollowed-out part of the roller being integrally formed on a wall of the roller, the hallowed-out part of the roller penetrates halfway through the wall of the roller, and the pattern and character block being defined by an element is detachably mounted to the hollowed-out part of the roller, and a reinforcing rib and a spring being provided, the pattern and character block is pressed into the hollowed-out part of the roller by means of the spring mounted on the reinforcing rib; and one or more patterns and characters of a normal watermark, a white watermark, a windowed security thread, and a paper marker are carved on the pattern and character block.

2. The paper forming mold of claim 1, wherein the hollowed-out part of the roller penetrates through the wall of the roller.

3. The paper forming mold of claim 1 wherein the pattern and character block is in interference fit with and in embedded connection with the hollowed-out part of the roller; or the pattern and character block is welded to the hollowed-out part of the roller; or the pattern and character block is adhered to the hollowed-out part of the roller; or the pattern and character block and the roller are respectively provided with threaded holes and are connected to each other via screws.

4. The paper forming mold of claim 3, wherein a centre of the screw is provided with a linearly-penetrating water filter hole; or the centre of the screw is provided with an L-shaped water filter hole having an L-shaped flow passage.

5. The paper forming mold of claim 1, wherein the roller is flush with a top surface of the pattern and character block, or the roller and the top surface of the pattern and character block are different in height.

6. The paper forming mold of claim 1, wherein: at a same height, diameters of the micropores are either all equal or not equal.

7. The paper forming mold of claim 1, wherein porosities of the micropores in different regions are not all equal.

8. The paper forming mold of claim 1, wherein the micropores are any one or a combination of cylindrical pores, corrugated pores and stepped pores.

9. The paper forming mold of claim 1, wherein passages of the micropores are arranged obliquely.

10. The paper forming mold of claim 1, wherein the spring is arranged on a side of the reinforcing rib facing the roller, a distal end of the spring is connected to a bottom of the pattern and character block, and the pattern and character block is pressed into the hollowed-out part of the roller under an elastic force of the spring compressed.

11. The paper forming mold of claim 1, wherein the pattern and character block is a rectangular block with upper and lower ends having the same length, or the pattern and character block is a wedge-shaped block with upper and lower ends having different lengths.

12. The paper forming mold of claim 1, wherein two or more pattern and character blocks are arranged in one hollowed-out part of the roller.

13. The paper forming mold of claim 10, wherein one pattern and character block is composed of two or more sub-modules, the pattern and character block is of a split-type structure.

14. A paper made by using the paper forming mold of claim 1.

* * * * *